3,276,427
ANIMAL COMMODE
William A. Edwards, P.O. Box 38, Algonquin, Ill.
Filed July 6, 1965, Ser. No. 469,653
6 Claims. (Cl. 119—1)

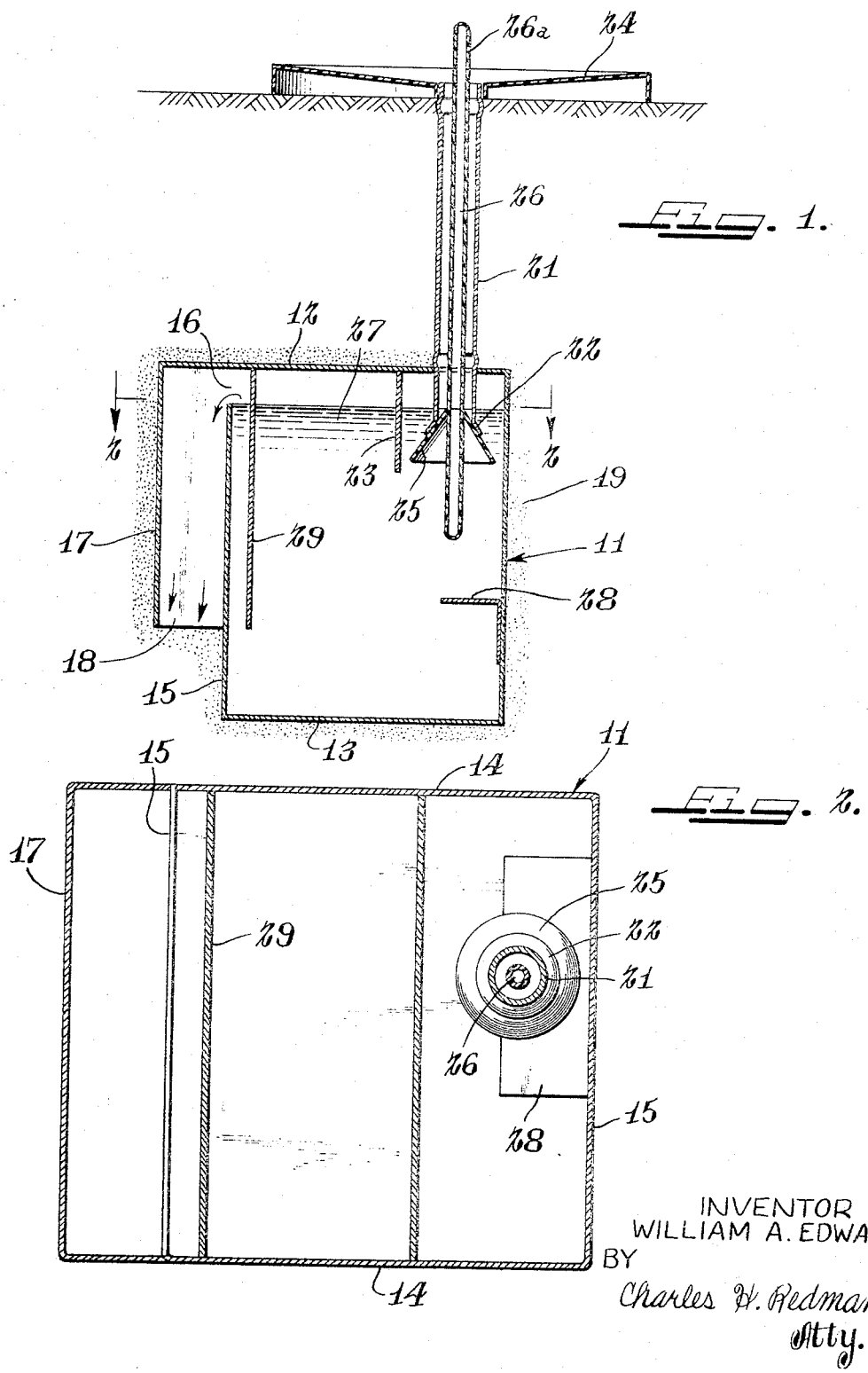

This invention relates to improvements in animal commodes and is particularly concerned with a commode for house pets designed for outdoor installation and which includes a septic tank and drainage means therefor.

The device of the present invention is designed for the disposal of animal excrements and it comprises generally a shallow platform situated above the ground and upon which animal excrements are deposited. The platform is in flow communication through a standpipe with a septic tank that is buried beneath the ground surface preferably in a surrounding mass of sand or gravel, or a mixture of both, into which the septic tank drains. Operable within the standpipe is a float valve designed to normally close the standpipe so as to minimize or eliminate objectionable odor and evaporation. The float valve is equipped with means that is effective to indicate when the addition of water is required in the septic tank.

It is, therefore, an object of the invention to provide an animal commode of the character referred to.

Another object of the invention is to provide a septic tank type of animal commode with novel valve means.

Another object is to provide novel means to indicate when the water in the septic tank reaches a level below that normally required for efficient operation.

Another object is to provide an animal commode of the character referred to which is not expensive or difficult to manufacture or install, which is easy to maintain and service and which is very efficient in its use.

The structure by means of which the above noted and other objects and advantages of the invention are attained will be described in the following specification, taken in conjunction with the accompanying drawings, showing a preferred illustrative embodiment of the invention, in which:

FIG. 1 is a vertical sectional view of the animal commode showing it installed in the ground; and, FIG. 2 is an enlarged horizontal sectional view taken substantially on line 2—2 of FIG. 1.

Referring to the exemplary disclosure of the invention shown in the accompanying drawings, the device comprises a substantially closed septic tank 11 including a top wall 12, a bottom wall 13 and connecting side and end walls 14, 15 respectively. One of the end walls terminates short of the top wall 12 so as to provide at the upper end of the tank, an outlet opening 16. Overlying the outside of opening 16 is an auxiliary housing 17 that is open on its bottom end 18 only.

The tank 11 and its auxiliary housing 17 are embedded in the ground preferably within a mass of sand, gravel or a combination of both, as shown at 19, for the purpose of aiding drainage of the system as is customary with such systems.

The top wall 12 of the septic tank has a standpipe 21 mounted therein at a location spaced from the outlet opening 16. This standpipe is in flow communication with the interior of the tank and its lower end, which extends downwardly below wall 12, is suitably flared outwardly, as at 22, to provide a valve seat. A wall 23 depending from top wall 12 is arranged between the standpipe and the outlet opening 16. The top of the standpipe terminates substantially at ground level and it has secured thereto, preferably detachably, a platform 24 of sufficient size to provide an animal with footing space thereon. The platform, which preferably is made of plastic material, is provided with a bottom surface that inclines in all directions toward the standpipe 21 so that excretions deposited thereon will flow into and down the standpipe and into the tank.

A valve element 25 normally closes the standpipe. As shown, this valve element comprises a flared body that cooperates with the complementary flared end 22 of the standpipe and it is integrally mounted on the lower end of a hollow sealed float tube or stem 26, also plastic, which extends loosely up through the standpipe. The stem 26 is of such length that when the valve is in closed position a substantial portion of its upper end, as at 26a, protrudes upwardly above platform 24. This end portion 26a is suitably painted or otherwise colored, preferably red, to afford it being readily visible from a distance. The stem 26 is held in an elevated or valve closing position by flotation in the water 27 contained within the tank.

When the water level recedes to a predetermined low, the stem 26 will drop downwardly, the movement being limited by a stop plate 28, until such time as the end portion 26a is no longer visible. The water supply is then replenished. Excrement deposited on the platform 24 and flowing down the standpipe will function to open the valve and allow the excrement to enter into the water within the septic tank.

As is well understood, septic action occurs near the top surface of the water within the tank 11. In order to provide for free flow of water through the outlet opening 16 without disturbing this action, a baffle plate 29 is provided inwardly of the opening 16. This baffle plate extends vertically downwardly from top wall 12 to a distance well below the level of liquid in the tank.

Although I have described a preferred embodiment of my invention, in considerable detail, it will be understood that the description thereof is intended to be illustrative, rather than restrictive, as many details of the structure disclosed may be modified or changed without departing from the spirit or scope of the invention. Accordingly, I do not desire to be restricted to the exact construction described.

I claim:

1. An animal commode comprising a platform, a standpipe in flow communication with the platform and depending therefrom, said platform having its surface inclined toward the standpipe, a fluid tank into which the lower end of said standpipe extends, a valve seat on the lower end of said standpipe, a float valve element arranged in said standpipe to cooperate with the seat, said element including a stem extending upwardly freely through said standpipe, a fluid level indicator on the upper end of said stem, an outlet adjacent to the upper end of said tank, a baffle in said tank adjacent said outlet and terminating short of the bottom of said tank, and a housing open on its bottom arranged over the outside of said outlet.

2. An animal commode comprising a platform, a standpipe in flow communication with the platform and depending therefrom, said platform having its surface inclined toward the standpipe, a fluid tank into which the lower end of said standpipe extends, a valve seat on the lower end of said standpipe, a float valve element arranged in said standpipe to cooperate with the seat, said element including a stem extending upwardly freely through said standpipe, a fluid level indicator on the upper end of said stem, an outlet adjacent to the upper end of said tank, and a baffle in said tank adjacent said outlet and terminating short of the bottom of said tank.

3. An animal commode comprising a platform, a standpipe in flow communication with the platform and depending therefrom, a fluid tank into which the lower end of said standpipe extends, a valve seat on the lower end of said standpipe, a float valve element arranged in said standpipe to cooperate with the seat, said element including a stem extending upwardly freely through said standpipe, a fluid level indicator on the upper end of said stem, an outlet adjacent to the upper end of said tank, and a baffle in said tank adjacent said outlet and terminating short of the bottom of said tank.

4. An animal commode comprising a platform, a standpipe in flow communication with the platform and depending therefrom, said platform having its surface inclined toward the standpipe, a fluid tank into which the lower end of said standpipe extends, a valve seat on the lower end of said standpipe, a float valve element arranged in said standpipe to cooperate with the seat, said element including a stem extending upwardly freely through said standpipe, an outlet adjacent to the upper end of said tank, and a baffle in said tank adjacent said outlet and terminating short of the bottom of said tank.

5. An animal commode comprising a platform, a standpipe in flow communication with the platform and depending therefrom, said platform having its surface inclined toward the standpipe, a fluid tank into which the lower end of said standpipe extends, a valve seat on the lower end of said standpipe, a float valve element arranged in said standpipe to cooperate with the seat, a fluid level indicator carried by said float valve element, an outlet adjacent to the upper end of said tank, and a baffle in said tank adjacent said outlet and terminating short of the bottom of said tank.

6. An animal commode comprising a platform, a standpipe in flow communication with the platform and depending therefrom, a fluid tank into which the lower end of said standpipe extends, a float valve assembly normally closing the bottom end of said standpipe, said assembly including a fluid level indicator extending upwardly freely through said standpipe, an outlet adjacent to the upper end of said tank, and a baffle in said tank adjacent said outlet and terminating short of the bottom of said tank.

References Cited by the Examiner

UNITED STATES PATENTS

| | | |
|---|---|---|
| 486,177 | 11/1892 | Couzens. |
| 1,813,329 | 7/1931 | Supplee _____ 119—15 |
| 2,068,140 | 1/1937 | Jaquith _____ 210—6 |

SAMUEL KOREN, *Primary Examiner.*

HUGH R. CHAMBLEE, *Examiner.*